(12) United States Patent
Haubmann

(10) Patent No.: US 12,717,217 B2
(45) Date of Patent: Aug. 25, 2026

(54) CAMERA STABILIZATION APPARATUS

(71) Applicant: Arnold & Richter Cine Technik GmbH & Co. Betriebs KG, Munich (DE)

(72) Inventor: Michael Haubmann, Vienna (AT)

(73) Assignee: Arnold & Richter Cine Technik GmbH & Co. Betriebs KG, Munich (DE)

( * ) Notice: Subject to any disclaimer, the term of this patent is extended or adjusted under 35 U.S.C. 154(b) by 218 days.

(21) Appl. No.: 18/211,934

(22) Filed: Jun. 20, 2023

(65) Prior Publication Data

US 2023/0418138 A1 Dec. 28, 2023

(30) Foreign Application Priority Data

Jun. 27, 2022 (DE) ......................... 102022115959.0

(51) Int. Cl.
*G03B 17/56* (2021.01)

(52) U.S. Cl.
CPC ................................. *G03B 17/561* (2013.01)

(58) Field of Classification Search
CPC ....... F16M 13/04; G03B 17/561; H04N 23/68
See application file for complete search history.

(56) References Cited

U.S. PATENT DOCUMENTS 9,243,741 B1 1/2016 Chu et al.
2005/0275526 A1* 12/2005 Huan ............... G08B 13/19645 348/E7.086
2012/0099851 A1* 4/2012 Brown ................... F16M 11/18 396/421
2016/0077410 A1* 3/2016 Lytle .................... H04N 23/661 248/371
2018/0247560 A1* 8/2018 Mackenzie .......... A61B 90/361
2020/0401019 A1* 12/2020 Hewitt ................... F16M 11/10
2021/0057990 A1* 2/2021 Wang ...................... H02M 3/00
2021/0165306 A1* 6/2021 Guo ..................... G03B 17/561

(Continued)

FOREIGN PATENT DOCUMENTS

DE 10145197 A1 5/2003
DE 102012107265 A1 2/2014
DE 202015003603 U1 7/2015

(Continued)

OTHER PUBLICATIONS

European Search Report issued in Application No. 23179260.7, dated Dec. 4, 2023.

(Continued)

*Primary Examiner* — Noam Reisner
(74) *Attorney, Agent, or Firm* — Amster, Rothstein & Ebenstein LLP

(57) ABSTRACT

A camera stabilization apparatus comprises a pendulum arm extending from a first end to a second end, the pendulum arm comprising a camera holding device at the first end for holding an associated camera and a functional element holding device at the second end for holding an associated functional element. The camera stabilization apparatus further comprises a signal concentration device configured to transmit, via a common transmission path, at least two different types of operating signals between the first end and the second end of the pendulum arm.

22 Claims, 6 Drawing Sheets

(56) References Cited

U.S. PATENT DOCUMENTS

Figure 1:
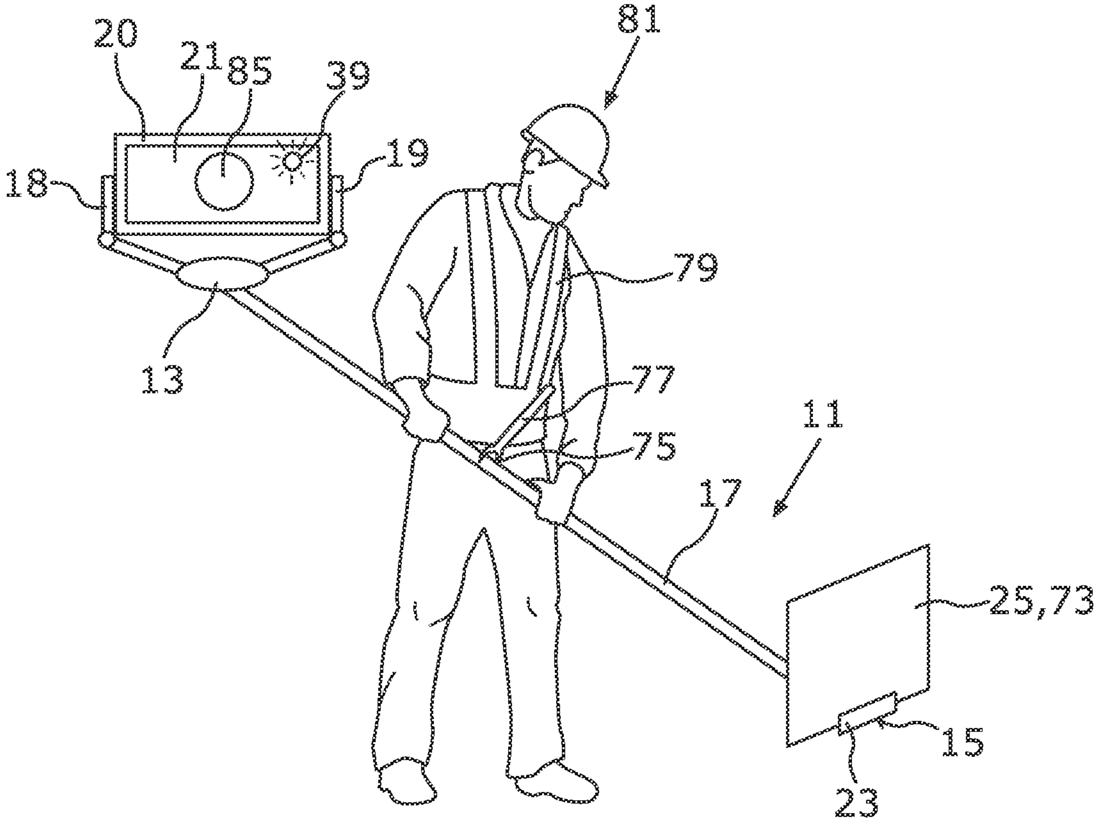

| | | | | |
|---|---|---|---|---|
| 2022/0026782 | A1 | 1/2022 | Goldburt et al. | |
| 2023/0152674 | A1* | 5/2023 | Tonokawa ............ | F16M 11/38 396/428 |

FOREIGN PATENT DOCUMENTS

| | | | |
|---|---|---|---|
| DE | 102015107483 | A1 | 11/2016 |
| EP | 2185855 | B1 | 10/2011 |
| EP | 1417536 | B1 | 2/2012 |
| EP | 3316567 | A1 | 5/2018 |
| ES | 2564393 | B1 | 12/2016 |
| WO | 2002081962 | A1 | 10/2002 |
| WO | 2011059526 | A1 | 5/2011 |

OTHER PUBLICATIONS

German Patent and Trademark Office Communication issued in Application No. 10 2022 115 959.0 dated Mar. 30, 2023.

* cited by examiner

CAMERA STABILIZATION APPARATUS

The present invention relates to a camera stabilization apparatus having a pendulum arm extending from a first end to a second end, the pendulum arm comprising a camera holding device at the first end thereof for holding an associated camera and a functional element holding device at the second end thereof for holding an associated functional element.

Such camera stabilization apparatuses may be used in particular for recording moving image sequences, for example, a scene of a motion picture film, in order to achieve stabilization of the associated camera provided for the recording for when the camera is moved to different positions during the recording. For this purpose, the camera stabilization apparatus may be mounted, for example, to the body of a cameraman or to a movable body that can be moved automatically and/or under control, so that the camera may be moved together with the body, but may be stabilized during the movement.

Furthermore, by arranging the associated camera at a first end of a pendulum arm of such a camera stabilization apparatus, the camera may also be moved and oriented relative to a body to which the camera stabilization apparatus is mounted. For this purpose, the camera stabilization apparatus can be mountable to the body via a support arm having a joint, for example, at a central portion of the pendulum arm. The functional element at the second end of the pendulum arm may form a counterweight to the associated camera, so that the center of gravity of the camera stabilization apparatus may be moved at least approximately to the center of the pendulum arm, in order to, on the one hand, be able to hold the camera stably in a predetermined position, but on the other hand, be able to deliberately change the position of the camera by slight forces applied to the pendulum arm.

Furthermore, in such a camera stabilization apparatus, it may be provided for a transmission of operating signals from the first end to the second end of the pendulum arm, in order to transmit image data generated by the camera and/or information about current camera settings to the functional element, for example. However, transmitting such operating signals requires providing cable connections between the first end and the second end of the pendulum arm, whereby for transmitting in particular a plurality of different types of operating signals a corresponding number of cable connections is thus required. Such cable connections, however, result in an increase in the weight of the camera stabilization apparatus, so that in particular, manually carrying the camera stabilization apparatus during longer recordings may be uncomfortable. In addition, the cable connections may influence the weight distribution of the camera stabilization apparatus and in particular of the pendulum arm, whereby the center of gravity of the camera stabilization apparatus may shift and make it difficult to precisely position the camera in space. If necessary, a manual and/or external fixing of the pendulum arm may therefore be required in order to be able to hold the camera in a specific position.

It is therefore an object of the invention to provide a camera stabilization apparatus which enables the transmission of different types of operating signals between the first end of the pendulum arm and the second end of the pendulum arm with as little weight as possible and with as little influence as possible on the weight distribution of the camera stabilization apparatus.

This object is achieved by a camera stabilization apparatus having the features of claim 1.

The camera stabilization apparatus comprises a signal concentration device which is configured to transmit at least two different types of operating signals between the first end of the pendulum arm and the second end of the pendulum arm via a common transmission path.

The signal concentration device thus makes it possible to concentrate the at least two different types of operating signals and to transmit them in a structured manner via the common transmission path in order to transmit the operating signals between the first end of the pendulum arm and the second end of the pendulum arm. By allowing different types of operating signals to be transmitted via the common transmission path, the different types of operating signals—unlike in conventional camera stabilization apparatuses—do not have to be led to the opposite end of the pendulum arm via respective individual transmission paths and for example a respective cable, but rather, the transmission of at least two different types of operating signals may take place via the common transmission path, in particular via a single transmission path. This transmission therefore makes it possible to reduce the number of transmission paths required for transmitting the at least two different types of operating signals, so that the overall weight of the camera stabilization apparatus may be reduced and an improved weight distribution may be achieved.

In particular, the different types of operating signals may be generated by and/or output from different devices, wherein these devices may, for example, be comprised by and/or connected to the associated camera and/or the camera holding device. The signal concentration device may be configured to receive from and/or output to different devices the different types of operating signals at the first end and/or the second end of the pendulum arm.

The signal concentration device may comprise a first part at the first end of the pendulum arm and a second part at the second end of the pendulum arm, wherein the transmission path runs between the first part and the second part.

For example, the signal concentration device may comprise a transmitter (at one end or both ends of the pendulum arm) and a receiver (at the other end or both ends of the pendulum arm), and/or a concentrator (at one end or both ends of the pendulum arm) and an extractor (at the other end or both ends of the pendulum arm), as will be further explained below.

For example, the different types of operating signals may include an image signal by means of which image data generated by the associated camera and/or an image sensor of the associated camera may be transmitted. In some cameras, different image signals are already generated in the camera on the basis of the image data generated by the image sensor, namely, on the one hand, in a format for dis-playing on a screen (which may be arranged in particular as a functional element at the second end of the pendulum arm) and, on the other hand, in a format for further transmission to an external radio receiver (in particular via a radio transmitter arranged as a functional element at the second end of the pendulum arm). In such embodiments, the two image signals have a different format and/or content and thus form two different types of operating signals. Another type of operating signal may for example be an image signal transmitted in a format for transmission to the associated camera from the second end (for example, from a radio receiver arranged there) to the first end of the pendulum arm (for example, to be shown on an integrated screen of the associated camera for control purposes).

The different types of operating signals may also include an audio signal generated by an associated microphone (for example, arranged at or in the camera and/or connected to the camera) and transmitted to the second end of the pendulum arm via the common transmission path.

The different types of operating signals may also include, for example, a power supply signal for supplying electrical power to the associated camera and/or the camera holding device and/or the associated functional element. Such a power supply signal may be generated in particular by an electrical power source arranged at the second end of the pendulum arm as a functional element, wherein a power supply cable may serve as a transmission path.

The different types of operating signals may also include, for example, a position sensor signal generated by a position sensor comprised by or connected to the camera or by a corresponding measuring device and which represents a position and/or orientation of the camera in space, for example in an image recording studio. However, such a position sensor may also be provided directly at the camera holding device and the position sensor signals may represent the position of the camera holding device and/or the camera, such that the at least two different types of operating signals may comprise, for example, image signals generated by an image sensor of the camera and position sensor signals generated by a position sensor arranged at the camera holding device and/or the camera. In particular, such position sensor signals may also include orientations of the camera holding device, which may be tiltable and/or rotatable relative to the pendulum arm, for example.

Furthermore, an inertial sensor, for example, may be provided at the camera and/or the camera holding device in order to determine accelerations of the camera, and the at least two operating signals may comprise an inertial sensor signal generated by such an inertial sensor, wherein such inertial sensor signals may represent in particular an operating signal which is different from an operating signal for transmitting image data and/or an operating signal for transmitting position sensor data and may be transmitted by the signal concentration device via the common transmission path.

Furthermore, as a further operating signal to be transmitted, a camera status signal for example may be considered, which may indicate whether the camera is turned on and/or a recording has been started. For example, the camera status signal may make it possible to show on a screen arranged at the second end of the pendulum arm whether a recording by the camera is currently taking place, whether the camera is in an inactive state and is switched on but without a recording taking place, or whether the camera is switched off. In particular, a red light (tally) that is displayed on the camera may also be shown on the screen, which in-forms, for example an actor or presenter, that a recording is in progress.

Moreover, it may be provided to transmit by means of a respective operating signal a setting value of a parameter of an objective (also referred to as lens) of the associated camera to the signal concentration device and, by way of the signal concentration device, to transmit it to the respective other end of the pendulum arm via the common transmission path. Such an objective setting signal thus represents a setting value of a parameter of an objective of the associated camera. For example, a focus value, a focal length, and/or a diaphragm aperture of the objective may be transmitted via the common transmission path. In particular, such values may be displayed on a screen arranged as a functional element at the second end of the pendulum arm, so that a camera operator may check the settings of the objective and bring about an adjustment, if necessary. Such information regarding the setting of an objective of the camera may in particular be transmitted, in addition to image data of the camera, as metadata by means of the signal concentration device via the common transmission path.

In particular, the signal concentration device may also be configured to transmit a control signal for the camera (including an objective of the associated camera) and/or a control signal for the camera holding device (e.g. for an electric motor of the camera holding device) via the common transmission path. For example, the signal concentration device may be configured to transmit a respective control signal for different objective-servomotors for the adjustment of objective-rings of an objective connected with the camera, to the first end of the pendulum arm via the common transmission path. A control signal for the camera may be produced, for example, by means of a functional element held at the second end of the pendulum arm or may be received at such a functional element. For this purpose, the control signal may first be transmitted from the functional element to a part of the signal concentration device associated with the second end of the pendulum arm, and from this part via the common transmission path to a part of the signal concentration device associated with the first end of the pendulum arm; from there, the control signal is finally transmitted to the objective-servomotor. Generally, the respective control signal may in particular be a control command for setting parameters of an objective of the associated camera and/or a control command for switching the camera on or off and/or a control command for starting or stopping a recording.

The signal concentration device may further be configured to transmit more than two operating signals of the aforementioned different types via the common transmission path, in particular three or four different types of operating signals. In particular, it is provided for within the context of the invention that more different types of operating signals are transmitted along the pendulum arm via the common transmission path than is conventionally the case by solely using standardized components.

Generally, it may thus be provided for, that at least two different types of operating signals may be transmitted from one end of the pendulum arm (first or second end) to the other end of the pendulum arm (second or first end) via the common transmission path, for example, an image signal and a position signal. However, it may also be provided for, that the signal concentration device is configured to transmit a first type of the at least two different types of operating signals in a first direction and a second type of the at least two different types of operating signals in a second direction, opposite to the first direction, via the common transmission path. To this end, the signal concentration device may be configured, for example, to transmit an image signal from the first end to the second end of the pendulum arm and to transmit at least one control signal for the camera from the second end to the first end of the pendulum arm via the common transmission path. In other words, the transmission of the at least two different types of operating signals via the common transmission path may take place in the same direction or in mutually opposite directions.

In connection with the present invention, operating signals that transmit sequentially generated data which are therefore different from each other but are of the same kind, are not to be understood as different types of image signals. For example, the signal concentration device is not merely configured to transmit image data generated sequentially by the camera, i.e. data representing images recorded sequentially in time, which are transmitted as the same type of operating signals from the camera to the signal concentration device via a common transmission path to the second end of the pendulum arm, but rather, at least two different types of operating signals may be transmitted via the common transmission path. For example, operating signals generated at different positions of the camera and/or the camera holding device may be bundled by means of the signal concentration device and transmitted via the common transmission path. As a result, it is not necessary for there to be a respective (separate) transmission path and in particular a respective cable connection between each of these positions, at which the operating signals are output by the camera and/or the camera holding device, and the second end of the pendulum arm.

In some embodiments, the different types of operating signals mentioned in relation to the invention may in particular be generated substantially simultaneously.

Furthermore, the different types of operating signals may be transferred in particular substantially simultaneously to the signal concentration device, whereby the signal concentration device may be configured to transmit simultaneously or with a time delay the simultaneously received different types of operating signals via the common transmission path. The signal concentration device may therefore be configured to receive at least two different types of operating signals simultaneously or substantially simultaneously and to structure them for (successive) transmission via the common transmission path, in order to firstly transmit a first of the at least two different types of operating signals and then a second of the at least two operating signals via the common transmission path. Generally, however, the at least two different types of operating signals may also be received at the signal concentration device with a time delay, in that, for example, a position sensor and an image sensor of the camera generate operating signals with a time delay and/or at a different frequency. The signal concentration device may therefore also be configured to transmit such time-delayed received operating signals via the common transmission path.

As explained above, the functional element holding device is intended to hold a functional element which, on the one hand, may form a counterweight to the camera but, on the other hand, may also serve to support a recording by the associated camera. In particular, the functional element holding device may comprise a mechanical interface (e.g. for a screw connection or clamp connection) and/or an electrical interface (e.g. electrical contacts). For example, the functional element may be a battery or accumulator that provides electrical power to the camera and/or the camera holding device. Furthermore, the functional element may be, for example, a screen (monitor) on which image data generated for example by the associated camera and transmitted as an operating signal by means of the signal concentration device, may be represented. This allows, for example, a cameraman to observe and check on the screen an image section recorded by the camera arranged at the first end of the pendulum arm, in order to adjust a position of the camera and thereby the recorded image section if necessary, although the cameraman cannot look through a viewfinder arranged directly on the camera. The functional element may be connected to the signal concentration device in such a way that the operating signal (image data) received at the second end of the pendulum arm may be further processed and/or represented at the functional element (screen) located there.

Other data transmitted to the signal concentration device in the form of the different types of operating signals may, for example, also be represented on a functional element configured as a display screen, in order to be able to provide the most comprehensive information possible with regard to the recording. For example, a position of the camera in space, information on whether the camera is in a recording state, settings of an objective of the camera, for example a focus value, a diaphragm aperture and/or a focal length, and/or signals of an inertial sensor system may be transmitted to the functional element by means of the signal concentration device via the common transmission path. On a display screen, in addition to the recorded image data, a red light (tally) displayed at the camera may therefore be represented, for example, which signals that a recording is being performed with the camera.

Furthermore, the functional element may comprise, for example, an input device for setting control commands for the associated camera, which may then be transmitted as a control signal from the signal concentration device to the camera via the common transmission path and the camera holding device. For example, the functional element may comprise one or more keys or a touch-sensitive screen for this purpose.

As will be apparent from the aforementioned and the further description, the terms "data", "signal concentration device", "transmission path" and "signal" are to be understood as generalized terms in relation to the present invention. In particular, said "data" and "signals" may include any type of information (as individual values, packets, or data/signal stream) and electrical supplies (e.g. the camera stabilize-tion apparatus). Therefore, an "operating signal" may also comprise a plurality of data of the same type (e.g. as a packet or data/signal stream); for example, a respective "image signal" may comprise the image information of an entire image generated by the associated camera. Said "transmission path" may also be referred to as a "signal line" and may, in particular, comprise a (wired) electrical or a (wireless) electromagnetic or optical transmission path, thus not necessarily comprising a cable connection.

Further embodiments may be found in the dependent claims, the description and the drawings.

The at least two different types of operating signals may comprise at least two (in particular two, three or four) of the following operating signals:

(a) a power supply signal for supplying the associated camera and/or the camera holding device and/or the associated functional element with electrical power, in particular from the second end to the first end of the pendulum arm;

(b) an image signal of the associated camera in a format for presenting on a screen, in particular from the first end to the second end of the pendulum arm;

(c) an image signal from the associated camera in a format for onward transmission to an external radio receiver, in particular from the first end to the second end of the pendulum arm;

(d) an image signal in a format for transmission to the associated camera, in particular from the second end to the first end of the pendulum arm;

(e) an audio signal from an associated microphone, in particular from the first end to the second end of the pendulum arm;

(f) a position sensor signal from a position sensor, in particular from the first end to the second end of the pendulum arm;

(g) a camera status signal representing a recording state, an inactive state, and/or an off state of the associated camera, in particular from the first end to the second end of the pendulum arm;

(h) an inertial sensor signal from an inertial sensor, in particular from the first end to the second end of the pendulum arm;

(i) an objective adjustment signal representing an adjustment value of a parameter of an objective of the associated camera, in particular from the first end to the second end of the pendulum arm;

(j) a control signal for controlling the associated camera including an objective of the associated camera, in particular from the second end to the first end of the pendulum arm; and/or (k) a control signal for controlling the camera holding device, in particular from the second end to the first end of the pendulum arm.

According to various embodiments, it is advantageous if the signal concentration device is configured to transmit at least the following two different types of operating signals between the first end and the second end of the pendulum arm via the common transmission path:

a power supply signal (a) and an image signal (b) or (c) or (d); or
a power supply signal (a) and an audio signal (e); or
a power supply signal (a) and a sensor signal (f) or (h); or
a power supply signal (a) and a camera status signal (g); or
a power supply signal (a) and an objective setting signal (i); or
a power supply signal (a) and a control signal (j) or (k); or
an image signal (b) and an image signal (c); or
an image signal (b) or (c) and an image signal (d); or
an image signal (b) or (c) or (d) and an audio signal (e); or
an image signal (b) or (c) or (d) and a sensor signal (f) or (h); or
an image signal (b) or (c) or (d) and a camera status signal (g); or
an image signal (b) or (c) or (d) and an objective adjustment signal (i); or
an image signal (b) or (c) or (d) and a control signal (j) or (k); or
an audio signal (e) and a sensor signal (f) or (h); or
an audio signal (e) and a camera status signal (g); or
an audio signal (e) and an objective adjustment signal (i); or
an audio signal (e) and a control signal (j) or (k); or
a sensor signal (f) or (h) and a camera status signal (g); or
a sensor signal (f) or (h) and an objective adjustment signal (i); or
a sensor signal (f) or (h) and a control signal (j) or (k); or
a camera status signal (g) and an objective adjustment signal (i); or
a camera status signal (g) and a control signal (j) or (k); or
an objective setting signal (i) and a control signal (j) or (k); or
a control signal (j) and a control signal (k).

In particular, the signal concentration device may comprise one or more signal inputs in order to receive the respective operating signal. Furthermore, the signal concentration device may comprise one or more signal outputs in order to output or forward a respective operating signal.

In some embodiments, the common transmission path may run through an interior space of the pendulum arm. In particular, in embodiments in which the transmission path comprises a cable, such a cable may thus run along the interior space of the pendulum arm so that the pendulum arm may also be used as a cable duct for leading the cable. Cables running along the outside of the pendulum arm which could affect movement of a cameraman with the camera stabilization apparatus, may thus be avoided. Also, the signal concentration device or parts thereof may be arranged in the interior space of the pendulum arm.

In some embodiments, the signal concentration device may be configured to transmit the at least two different types of operating signals optically, electrically, or electromagnetically. For this purpose, the common transmission path may be formed between a first part of the signal concentration device at the first end of the pendulum arm and a second part of the signal concentration device at the second end of the pendulum arm, for example, by a fiber-optic connection, in particular, a fiber-optic cable, an electrical cable, in particular, a coaxial cable, a clear line-of-sight for transmitting optical signals, or a radio connection, as will be explained in more detail below.

In some embodiments, the signal concentration device may be configured to transmit the at least two different types of operating signals wirelessly. Furthermore, in some embodiments, the signal concentration device may be configured to transmit the at least two different types of operating signals in a wired manner (i.e. wired connection). As explained above, wireless transmission may include, for example, a line-of-sight connection or a radio connection, while wired transmission may be carried out, for example, via a fiber-optic connection, in particular, a fiber-optic cable, or an electrical cable, in particular, a coaxial cable.

In some embodiments, the signal concentration device may be configured to transmit, via the common transmission path, one of the at least two different types of operating signals from the first end to the second end of the pendulum arm and another of the at least two different types of operating signals from the second end to the first end of the pendulum arm. In other words, the transmission of the at least two different types of operating signals, particularly in any of the aforementioned combinations, may take place in mutually opposite directions.

In such embodiments, the signal concentration device may comprise a first signal transmitter and a first signal receiver at the first end of the pendulum arm, and a second signal transmitter associated with the first signal receiver and a second signal receiver associated with the first signal transmitter at the second end of the pendulum arm (e.g., electrical, opto-electronic, or radio transmitters and receivers).

In some embodiments, the signal concentration device may be configured to transmit the at least two different types of operating signals from one end to the other end of the two ends of the pendulum arm via the common transmission path. In other words, the transmission of the at least two different types of operating signals, in particular in one of the aforementioned combinations, may take place in the same direction.

In some embodiments, the signal concentration device may comprise a signal concentrator at one of the two ends of the pendulum arm and a signal extractor at the other of the two ends of the pendulum arm. The signal concentrator may be configured to concentrate the at least two different types of operating signals and transmit them in a structured manner via the common transmission path. The signal extractor may be configured to return the operating signals transmitted via the common transmission path back into individual signals in a complementary manner. The signal concentrator may comprise, for example, a multiplexer and the signal extractor may comprise, for example, a demultiplexer. In particular, in such embodiments, the signal concentrator may be configured to receive the at least two different types of operating signals in parallel at respective signal inputs and to transmit them serially via the common transmission path. For example, the signal concentrator may receive an image signal generated by the camera at a first signal input and a position sensor signal generated by a position sensor at a second signal input, in order to first transmit the image signal and then the position sensor signal to the signal extractor via the common transmission path, for example. For this purpose, the common transmission path may comprise, for example, an electrical cable connecting the signal concentrator to the signal extractor, wherein firstly the image signal and then the position signal are transmitted via this (one) electrical cable. Thereupon, for example, again an image signal representing a subsequently generated image from the camera and then an updated position sensor signal may be transmitted via the common transmission path, and so on.

The signal extractor, on the other hand, may in particular have a signal input for receiving the different types of operating signals transmitted via the common transmission path, wherein the signal extractor may be configured to extract the respective different types of operating signals and to forward them as parallel signals, for example, to the functional element at the second end of the pendulum arm. Accordingly, the signal extractor may have a respective signal output for outputting the different types of operating signals.

Multiplexing and demultiplexing the different types of operating signals thus enables the at least two different types of operating signals to be transmitted via the common transmission path, whereupon the different types of operating signals may be extracted again after being received and further processed separately and/or read out at the functional element. Although the different types of operating signals may thus be ultimately available individually at the respective end of the pendulum arm, it is not necessary for this purpose to transmit each of the different types of operating signals via a respective (separate) transmission path between the first end and the second end. The concentration of the different types of operating signals on the common transmission path, rather makes it possible to dispense with such separate transmission paths and therefore to minimize the weight of the camera stabilization apparatus and to achieve the most precise weight distribution possible.

In some embodiments, the signal concentrator may be configured to receive the at least two different types of operating signals at respective signal inputs and combine them into a common signal stream. In particular, the signal concentrator may comprise a plurality of signal inputs for this purpose, in order to be able to receive a respective one of the at least two different types of operating signals at a respective signal input, for example from the associated camera and/or the camera holding device, wherein, however, the at least two different types of operating signals may be transmitted to the common transmission path via a common output. Generally, the signal concentrator may also be configured to combine more than two different types of operating signals into a common signal stream. For example, it may be provided for, that the signal concentrator device comprises an Ethernet interface via which different types of operating signals transmitted via two to four pairs of wires are converted to a common pair of wires which form the common transmission path. The signal concentrator may in particular comprise a multiplexer for this purpose.

In some embodiments, the signal extractor may be configured to extract the at least two different types of operating signals from the common signal stream. In particular, the signal extractor may comprise a demultiplexer, in order to receive for example serially transmitted different types of operating signals via the common transmission path, but is able to extract the individual different types of operating signals and in particular to forward them separately, for example to the functional element.

In some embodiments, the common transmission path may comprise a camera data cable, wherein the signal concentrator may be configured to transmit the common signal stream to the signal extractor via the common camera data cable. In particular, the camera data cable may be configured as a fiber-optic cable and/or a coaxial cable. Further, the camera data cable may run along the interior space of the pendulum arm, wherein the signal concentrator and the signal extractor may be interconnected via the camera data cable. In such embodiments, the at least two different types of operating signals may be transmitted in particular as a common signal stream via a single camera data cable, so that a respective camera data cable need not be provided for each of the operating signals. By concentrating the signals, the weight of the camera stabilization apparatus may therefore be minimized, however, at the same time, it allows transmission of different types of operating signals and correspondingly different types of information to the respective end of the pendulum arm.

In some embodiments, an electrical power source may be arranged at the second end of the pendulum arm for supplying electrical power to the associated camera and/or camera holding device (e.g. drive motor). The transmission of the electrical power forms a power supply signal representing one of the at least two different types of operating signals. In particular, the electrical power source may be configured as an accumulator or battery. By being arranged at the second end of the pendulum arm, the electrical power source may in particular also act as a counterweight for the camera arranged at the first end of the pendulum arm and serve the dual function of supplying electrical power on the one hand, and stabilizing and balancing the camera on the other hand. In some embodiments, the transmission path may include a power supply cable. In such embodiments, the signal concentration device may be configured to transmit another one of the at least two different types of operating signals via the power supply cable in addition to the power supply signal.

In particular, the signal concentration device may be configured to modulate the at least two different types of operating signals and/or the aforementioned common signal stream onto the power supply cable in order to transmit the at least two different types of operating signals. The power supply cable, which is required anyway for supplying power to the camera and/or the camera holding device and via which electrical energy may be transmitted, in particular, from the second end of the pendulum arm to the first end of the pendulum arm, may thus also be used in such embodiments to transmit at least one further operating signal from the first end of the pendulum arm to the second end of the pendulum arm in a direction opposite to a transmission direction of the power supply signal. By thus using the power supply cable, which is often absolutely necessary for the power supply, also for the transmission of one or more further operating signals, a cable specifically provided for the transmission of these further operating signals may be dispensed with and the weight of the camera stabilization apparatus may be reduced accordingly.

The invention also relates to a camera stabilization apparatus having a pendulum arm extending from a first end to a second end, which pendulum arm has at the first end a camera holding device for holding an associated camera and at the second end an electrical power source for supplying the camera and/or the camera holding device with electrical power, wherein the electrical power source is connectable to the camera holding device and/or the associated camera via a power supply cable running within an interior space of the pendulum arm, and wherein a signal concentration device is configured to receive at least one operating signal from the associated camera and/or the camera holding device and to transmit it to the second end of the pendulum arm via the power supply cable.

Furthermore, in some embodiments it may be provided for, that apart from the power supply cable—and optionally an antenna cable of a radio transmitter for transmitting an operating signal to an external radio receiver, which will be de-scribed in more detail below—no further cable extends in the interior space of the pendulum arm between the first end and the second end of the pendulum arm. In particular, for transmitting the different types of operating signals between the first end and the second end of the pendulum arm, only the power supply cable may thus be used, which is absolutely required anyway, without the weight of the camera stabilization apparatus being significantly increased.

In some embodiments, a first voltage transformer may be arranged at the first end of the pendulum arm and a second voltage transformer may be arranged at the second end of the pendulum arm. The second voltage transformer may be configured to increase an electrical voltage value of the power supply signal from the electrical power source to an increased supply voltage, wherein the first voltage transformer may be configured to reduce the increased supply voltage to a value of an electrical useful voltage adapted for the associated camera and/or camera holding device. Such an increase in the supply voltage at the second end of the pendulum arm may allow the use of a power supply cable with a smaller cross-section, and therefore a lighter weight, in order to transmit electrical power from the electrical power source to the associated camera and/or camera holding device. Also, as a result thereof, the weight of the camera stabilization apparatus may be reduced and the weight distribution may be improved. On the other hand, due to the first voltage transformer being arranged at the first end of the pendulum arm, the voltage may be reduced again to a voltage value with which the associated camera and/or the camera holding device may be operated. For example, it may be provided for, to increase a supply voltage provided by the electrical power source to 48 V or to 60 V by means of the second voltage transformer, and for example to reduce this voltage to a useful voltage of 12 V or 24 V by means of the first voltage transformer. The electrical power source may for example be configured to provide a supply voltage of 12 V or 24 V. Said voltage transformers may in particular be configured as direct voltage transformers and therefore, also be referred to as DC-DC converters.

As explained above, in some embodiments, the signal concentration device may be configured to optically transmit the different types of operating signals between a first part of the signal concentration device at the first end of the pendulum arm and a second part of the signal concentration device at the second end of the pendulum arm. In particular, such transmission may take place via a fiber-optic connection.

Alternatively to such a fiber-optic transmission path, in some embodiments there may exist a line-of-sight (e.g. air or vacuum) between a first part of the signal concentration device at the first end of the pendulum arm and a second part of the signal concentration device at the second end of the pendulum arm, wherein the signal concentration device may be configured to optically transmit the at least two different types of operating signals via the line-of-sight. Such a transmission of the different types of operating signals may also take place in particular in the interior space of the pendulum arm, wherein the line-of-sight forms the common transmission path. Such a transmission of the operating signals may thus take place completely wirelessly, so that the transmission of the operating signals is not accompanied by an increase in the weight of the camera stabilization apparatus.

Furthermore, wireless transmission of the at least two different types of operating signals may be achieved, in that, in some embodiments the signal concentration device is configured to transmit the at least two different types of operating signals via a radio connection. For example, a Bluetooth connection, a WLAN/WiFi connection, a cellular connection, or an NFC (near field communication) connection may exist between a first part of the signal concentration device at the first end of the pendulum arm and a second part of the signal concentration device at the second end of the pendulum arm. The signal concentration device may comprise a respective radio device at the two ends of the pendulum arm, which is configured to transmit and/or receive the (electromagnetic) operating signals. Consequently, in such embodiments, the radio connection may form the common transmission path, whereby again the wireless transmission of the at least two different types of operating signals enables a reduction in the weight of the camera stabilization apparatus compared to a wired transmission.

In some embodiments, a radio transmitter may be arranged at the second end of the pendulum arm which is configured to send at least one of the operating signals transmitted to the second end of the pendulum arm via the transmission path to an external radio receiver via a radio connection. For example, by means of such a radio transmitter, an image signal of the camera transmitted from the first end of the pendulum arm to the second end may be sent to an external radio receiver, in order to display the image data transmitted by the image signal on a screen in an image recording studio and to enable, for example, a director to check the recorded image section. Other types of operating signals transmitted from the first end to the second end of the pendulum arm may also be transmitted from the radio transmitter to an external radio receiver, so that, for example, a position sensor signal, a camera status signal, an objective adjustment signal, or an inertial sensor signal of the associated camera may also be evaluated at a remote location or be displayed and checked on an external screen.

The arrangement of the radio transmitter at the second end of the pendulum arm makes it possible to also use the radio transmitter as a counterweight to the associated camera. Furthermore, in some embodiments, the radio transmitter may be configured as a radio transmitting and receiving device, whereby in particular control signals for the associated camera can also be received via the radio transmitter in such embodiments. These control signals may be transmitted from the signal concentration device to the associated camera in particular as operating signals via the common transmission path. In this respect, in such embodiments, in particular a first type of operating signal, for example for transmitting image data, may be transmitted from the first end to the second arm of the pendulum arm via the common transmission path, while a second type of operating signal, for example a control signal, may be transmitted in the opposite direction from the second end to the first end of the pendulum arm via the common transmission path. The control signal may be, for example, control commands for adjusting parameters of an objective of the associated camera and/or control commands for turning the camera on or off and/or control commands for starting or stopping a recording.

In some embodiments, a camera-facing antenna may be associated with the radio transmitter for establishing radio communication with the external radio receiver, wherein the camera-facing antenna is arranged at the first end of the pendulum arm. The camera-facing antenna may be connected to the radio transmitter at the second end of the pendulum arm via an antenna cable running within the pendulum arm. In particular, the camera-facing antenna may be implemented as an antenna cable such that the antenna cable may extend from the radio transmitter, through the pendulum arm, and out of the first end of the pendulum arm. This makes it possible to arrange an antenna of the radio transmitter which is arranged at the second end of the pendulum arm to be within the region of the camera, so that this antenna is not arranged in the immediate vicinity of the ground, at least in such typical recording situations in which the camera is positioned distanced from the ground by appropriate adjustment of the pendulum arm, even though the radio transmitter arranged at the second end is located in the vicinity of the ground. Any shadowing effects in the transmission of the operating signals due to the arrangement of the antenna near the ground may thus be avoided in most recording situations, while at the same time the radio transmitter may be used as a counterweight to the associated camera. Such an arrangement of the antenna cable within the pendulum arm, however, is ultimately made possible, in particular by the signal concentration device explained above regarding the transmission of the operating signals between the first end of the pendulum arm and the second end of the pendulum arm via the common transmission path, so that a free space may be obtained in the interior space of the pendulum arm which is available for the arrangement of the antenna cable. In some embodiments, the antenna cable may also serve as a transmission path for other (different) operating signals.

In some embodiments, the radio transmitter may further have associated therewith an antenna facing away from the camera for establishing the radio connection with the external radio receiver, wherein the camera-facing-away antenna is arranged at the second end of the pendulum arm. In particular, both a camera-facing-away antenna and a camera-facing antenna may be associated with the radio transmitter for establishing the radio connection, so that the radio transmitter may be configured as a diversity/MIMO system in order to be able to compensate for any destructive interference during signal transmission from one of the camera-facing-away antenna or the camera-facing antenna to the external radio receiver. In particular, such an arrangement of two antennas may ensure that in recording situations in which the first end or the second end of the pendulum arm is arranged near the ground, the respective other end is located away from the ground, so that at least one antenna which is away from the ground may always be available for signal transmission, and shadowing effects due to the proximity of the respective other antenna to the ground may be compensated.

In some embodiments, the signal concentration device may comprise a plurality of modules which are configured to transmit and/or receive the at least two different types of operating signals via different interface configurations. For example, the signal concentration device may include a Universal Asynchronous Receiver Transmitter (UART), a Controller Area Network (CAN), a Local Interconnect Network (LIN), an Ethernet module, a Serial Digital Interface (SDI), a Bluetooth device, a cellular device, a Near Field Communication (NFC) device, and/or a WLAN/WiFi device, in order to transmit and/or receive the at least two different types of operating signals. Such a modular design of the signal concentration device may, in particular, allow the camera stabilization apparatus to be used flexibly with different cameras and/or functional elements in order to enable adaptation to corresponding interface configurations supported by the camera and/or the functional element.

In some embodiments, the signal concentration device may be configured to compress image data received from the associated camera and transmit the compressed image data as an image signal via the common transmission path. As explained above, the associated camera may be configured in particular to generate image data representing an image produced by the camera, whereby this image data may be transmitted by one of the at least two different types of operating signals. By compressing the image data, which may in particular represent the largest amount of data to be transmitted between the first end of the pendulum arm and the second end of the pendulum arm, the amount of data to be transmitted may be reduced, which in turn may allow the image data to be transmitted via a smaller number of cables and/or thinner cables. In particular, the signal concentration device may be configured to encode the image data as a mezzanine codec in order to achieve lossless compression. The part of the signal concentration device arranged at the respective other end of the pendulum arm may be configured to de-compress the received image data in order to transmit it, for example, to a screen arranged at the second end of the pendulum arm as a functional element and to be able to display it there. Generally, such compression of the image data may also be provided for wireless transmission of the different types of operating signals.

In some embodiments, a screen may be arranged at the second end of the pendulum arm, which is configured to display image data generated by the associated camera and transmitted via the common transmission path. In particular, this may enable a cameraman guiding the camera stabilization apparatus to immediately check on the screen the scene being recorded by the camera in order to make a correction to the orientation of the camera, if necessary. In addition, other data transmitted in the form of the different types of operating signals may also be shown on the screen in order to inform a cameraman, for example, about the position of the camera, a recording state of the camera and/or any settings of an objective of the camera. In addition, the screen may also act as a counterweight to the camera.

In some embodiments, the first end and the second end of the pendulum arm may be open or be openable without tools. Such a configuration of the pendulum arm may allow easy access to the interior space of the pendulum arm, for example, to arrange or orientate a camera data cable that forms the common transmission path.

Furthermore, the pendulum arm may be configured to be tubular.

In some embodiments, the length of the pendulum arm may be variable. In particular, the pendulum arm may comprise an inner tube and an outer tube, which may be axially displaceable relative to each other to change the length of the pendulum arm. For example, by such a change in length, the circumference of a movement of the camera holding device and thus the associated camera and/or the radius of a circular path along which the camera holding device is movable, may be adjustable.

In some embodiments, the pendulum arm may be articulately connected, in particular gimbaled, to a support arm for supporting the camera stabilization apparatus. In particular, the camera stabilization apparatus may be held by a cameraman via the support arm or may be mountable to the body of a cameraman by means of the support arm. Such an articulated or gimbaled suspension of the pendulum arm may in particular prevent the cameraman's movements, for example during a run or race, from being transferred to the camera and prevent its orientation relative to the cameraman from changing during such a movement.

In some embodiments, the camera stabilization apparatus may further comprise a strap for mounting the camera stabilization apparatus to a user's body. In particular, the aforementioned support arm may be mounted or be mountable to the strap so that a cameraman does not have to carry with his arms the entire weight of the camera stabilization apparatus and the associated components, but rather, the weight may be supported over the entire body. The design of the camera stabilization apparatus having a pendulum arm may furthermore allow the camera to be held and automatically stabilized via the strap when the weight of the camera stabilization apparatus is appropriately distributed, so that the cameraman need only ensure for changes in the position of the camera, but not for balancing a momentary position.

The invention is explained below purely by way of example with reference to the embodiments and the drawings. Identical or similar elements are identified therein with the same reference numbers.

FIG. 1 shows a representation of a camera stabilization apparatus carried by a cameraman, and FIGS. 2A to 2E show schematic representations of respective embodiments of the camera stabilization apparatus.

FIG. 1 shows a camera stabilization apparatus 11 comprising a pendulum arm 17 extending from a first end 13 to a second end 15, wherein a camera holding device 19 is arranged at the first end 13 for holding an associated camera 21. The camera holding device 19 comprises a mount 18 and a frame 20, pivotable relative to the mount 18, in which the associated camera 21 is inserted. In addition, the mount 18 may be rotatably mounted to the first end 13 of the pendulum arm 17, so that an orientation of the camera 21 may be adjustable by rotating the mount 18 and a tilt of the camera 21 may be adjustable by pivoting the frame 20.

In particular, the associated camera 21 may be configured as a motion picture camera, in order to record a scene for a motion picture film or a television pro-gram, for example. In order to be able to indicate to an actor or a presenter that a recording has been started, a red light 39 is configured at the outside of the camera 21, which may be referred to as a tally and may, for example, light up or flash while a recording is being performed. Furthermore, the camera 21 comprises an objective 85 which in particular may be adjustable so that a focal length, a focus value, and/or an iris diaphragm aperture of the camera 21 may be changeable. For adjusting the objective 85, for example, objective actuators, not shown, may be provided and which may be configured to drive a respective objective ring of the objective 85, wherein said parameters may be adjustable by moving a respective objective ring to a specific rotational position. Control commands for such objective actuators may be transmittable, for example, via radio to the camera 21 and/or the camera stabilization apparatus 11.

The camera stabilization apparatus 11 in particular is provided to be able to position and balance the camera 21 in a space. For this purpose, the pendulum arm 17 of the camera stabilization apparatus 11 is gimbaled via a gimbal connection 75 to a support arm 77 via which the camera stabilization apparatus 11 may be held by a cameraman 81. To facilitate carrying the camera 21 as well as the camera stabilization apparatus 11, the support arm 77 is mounted to a strap 79, so that the cameraman 81 does not have to carry the camera stabilization apparatus 11 with his arms, but may support its weight over his entire body.

By having the pendulum arm 17 gimbaled to the support arm 77, in particular the camera 21 may be held balanced without being displaced relative to the cameraman 81 due to movements of the cameraman 81, such as running to quickly change the position of the camera 21. In order to stabilize the camera 21 in space, the pendulum arm 17 extends beyond the gimbal connection 75 to the second end at which additionally a functional element holding device 23 is arranged for holding an associated functional element 25. In particular, this functional element may form a counterweight to the associated camera 21 which allows the center of gravity of the camera stabilization apparatus 11 to move into the region of the gimbal connection 75 when the camera 21 is held, so that the camera 21 is stabilized against unwanted movements. On the other hand, the camera 21 may be pivoted by slight but deliberate forces applied by the cameraman 81 by means of the pendulum arm 17, in order to change a position of the camera 21 relative to the cameraman 81.

In the embodiment shown in FIG. 1, the functional element 25 held by the functional element holding device 23 of the camera stabilization apparatus 11 is configured as a screen 73. Such a screen 73 may, in particular, enable the cameraman 81 to review image data recorded by the camera 21 and to check whether the camera 21 is correctly oriented. In addition, the screen 73 may in particular display further information relating to the camera 21 which the cameraman 81 may take into account during a recording. For example, the screen 73 may also show whether the red light 39 of the camera 21 is illuminated and whether the camera 21 is in a recording state. Similarly, it may be displayed when the camera 21 is on but not recording and the camera 21 is in an inactive state, or it may be show when the camera 21 is off. In addition, settings of the objective 85 of the camera 21, for example, may be shown on the screen 73 so that the cameraman 81 may check if the correct objective settings have been made.

While such a camera stabilization apparatus 11 generally allows to orientate the associated camera 21 to be balanced in space and to be carried via the strap 79, it is nevertheless necessary to configure the camera stabilization apparatus 11 to be as light as possible in order to also allow it to be carried for extended periods of recording. In addition, such a camera stabilization apparatus 11 requires the weight to be distributed as precisely as possible in order to be able to determine the center of gravity of the camera stabilization apparatus 11 and to be able to balance the camera 21. However, this is made complicated by the fact that operating signals must be transmitted from the camera 21 or the first end 13 of the pendulum arm 17 to its second end 15 in order to be able to display the corresponding information, such as image data or settings of the objective 85, on the screen 73. However, in order to be able to transmit such information and, in particular, different types of operating signals of the camera 21, a plurality of cable connections running in the pendulum arm 17 and leading from the first end 13 to the second end is usually required, which may significantly increase the weight of the camera stabilization apparatus 11. In addition, leading such a plurality of cables may have a detrimental effect on the weight distribution of the camera stabilization apparatus 11.

As FIGS. 2A to 2E show, this problem may however be addressed by the camera stabilization apparatus 11 disclosed herein, by arranging at the first end 13 of the pendulum arm 17 a first part 27 of a signal concentration device 26 and arranging at the second end 15 of the pendulum arm 17 a second part 28 of the signal concentration device 26, which signal concentration device is configured to transmit at least two different types of operating signals B1, B2, B3, B4 and B5 between the first end 13 of the pendulum arm 17 and the second end 15 of the pendulum arm 17 via a common transmission path 31.

The first part 27 of the signal concentration device 26 may comprise, for example, a signal transmitter 32, and the second part 28 of the signal concentration device 26 may comprise, for example, an associated signal receiver 29, and/or vice versa. The first part 27 of the signal concentration device 26 may be configured, for example, to receive from the associated camera 21 and/or the camera holding device 19 at least two different types of operating signals B1, B2, B3 and B4 and to transmit the at least two different types of operating signals B1, B2, B3 and B4 to the signal receiver 29 via the common transmission path 31.

Figure 2A:
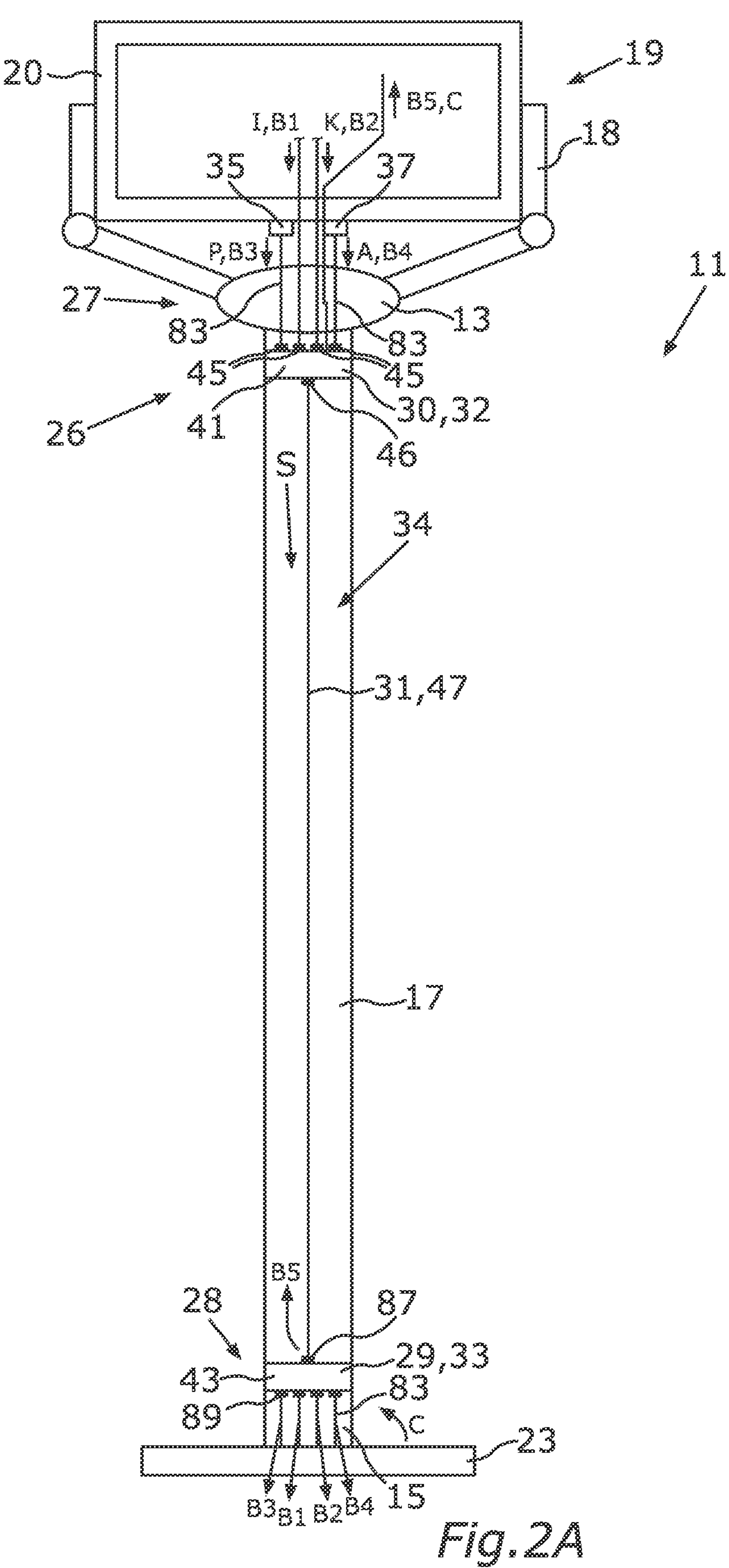

For example, as FIG. 2A shows, it may be provided for, that a position sensor 35 and an inertial sensor 37 are connected to the camera holding device 19, wherein the position sensor 35 is configured to generate a position sensor signal P which represents a position of the camera 21 and/or the camera holding device 19 in space, and wherein the inertial sensor 37 is configured to generate an inertial sensor signal A which represents an acceleration of the camera holding device 19 and thus also of the camera 21. In this respect, the signals P and A of the position sensor 35 and the inertial sensor 37 represent different types of operating signals B3 and B4, which may be transmitted via a respective data cable 83 to a respective signal input 45 of the first part 27 of the signal concentration device 26. In addition, two further data cables 83 are connected to respective signal inputs 45 of the first part 27 of the signal concentration device 26 and which are provided for receiving an image signal I generated by the camera 21 and a camera status signal K representing a recording state, an inactive state and/or a switched-off state of the camera 21, as further different types of signals B1 and B2 and transmitting them to the first part 27 of the signal concentration device 26.

In the embodiment shown in FIG. 2A, the first part 27 of the signal concentration device 26 comprises a signal concentrator in the form of a multiplexer 41, which is configured to combine the operating signals B1, B2, B3 and B4 received in parallel via the signal inputs 45 into a serial common signal stream S and to transmit this common signal stream S, via a signal output 46 of the signal transmitter 32 and the common transmission path 31, to the data receiver 29 of the second part 28 of the signal concentration device 26. The common transmission path 31 therefore comprises a camera data cable 47, which, in particular as a fiber-optic cable may establish a fiber-optic connection between the first part 27 and the second part 28 of the signal concentration device 26, or as an electric cable may establish an electrical connection between the first part 27 and the second part 28 of the signal concentration device 26. Furthermore, the camera data cable 47 may be configured as a coaxial cable, for example.

The second part 28 of the signal concentration device 26 comprises a signal extractor in the form of a demultiplexer 43. The demultiplexer 43 is configured to receive the common signal stream S at a signal input 87 of the signal receiver 29 and to extract the different types of operating signals B1, B2, B3 and B4 from the common signal stream S. Accordingly, the respective operating signals B1, B2, B3 and B4 may be transmitted from the second part 28 of the signal concentration device 26 at respective signal outputs 89 and in turn via respective data cables 83 to the functional element holding device 23 and/or the functional element 25 to be held, in particular the screen 73.

Such signal concentration by means of the signal concentration device 26 thus makes it possible to combine the different types of operating signals B1, B2, B3 and B4, which are generated in particular by different elements and/or devices, for example, an image sensor of the camera 21 and the position sensor 35, into the common signal stream S and to transmit it from the first end 13 to the second end of the pendulum arm 17 via only one camera data cable 47. Instead of respective cables and, for example, cables 83 passing from the first end 13 to the second end 15 of the pendulum arm 17 for the individual operating signals B1, B2, B3 and B4, there is thus only the common camera data cable 47 which is lead from the first part 27 to the second part 28 of the signal concentration device 26, so that the weight of the camera stabilization apparatus 11 may be reduced by this saving of cables and the weight distribution of the camera stabilization apparatus 11 may also be improved. In addition, the common transmission path 31 or the camera data cable 47 extends in an interior space 34 of the pendulum arm 17, so that the camera data cable 47 is not lead outside the pendulum arm 17 which could possibly restrict movements of the cameraman 81. For this purpose, the pendulum arm 17 is configured, in particular, in a tubular shape.

Furthermore, however, it may also be provided for, to transmit via the common transmission path 31 at least one further operating signal B5 of a different type than the operating signals B1, B2, B3 and B4, from a signal transmitter 33 of the second part 28 of the signal concentration device 26 to the first part 27 of the signal concentration device 26, which may comprise an associated signal receiver 30 for receiving the operating signals B5. The operating signals B5, which are transmitted in the opposite direction with respect to the operating signals B1, B2, B3 and B4, may in particular be a control signal C for the associated camera 21, which may be adjustable at the functional element 25, for example. Such a control signal C may in particular relate to settings of the objective 85, wherein parameters of the objective 85 may be adjustable, for example, via objective-actuators, not shown in the figures, so that the control signal C may relate to the control of such objective-actuators. Accordingly, with respect to the operating signal B5, the signal output 46 of the first part 27 of the signal concentration device 26 may act as a signal input of the signal receiver 30 in order to be able to transmit the received control signal C to the camera 21 or the objective 85. Furthermore, a con-trot signal C may serve, for example, to switch the camera 21 on and/or off, and/or, to start and/or stop a recording.

Figure 2B:
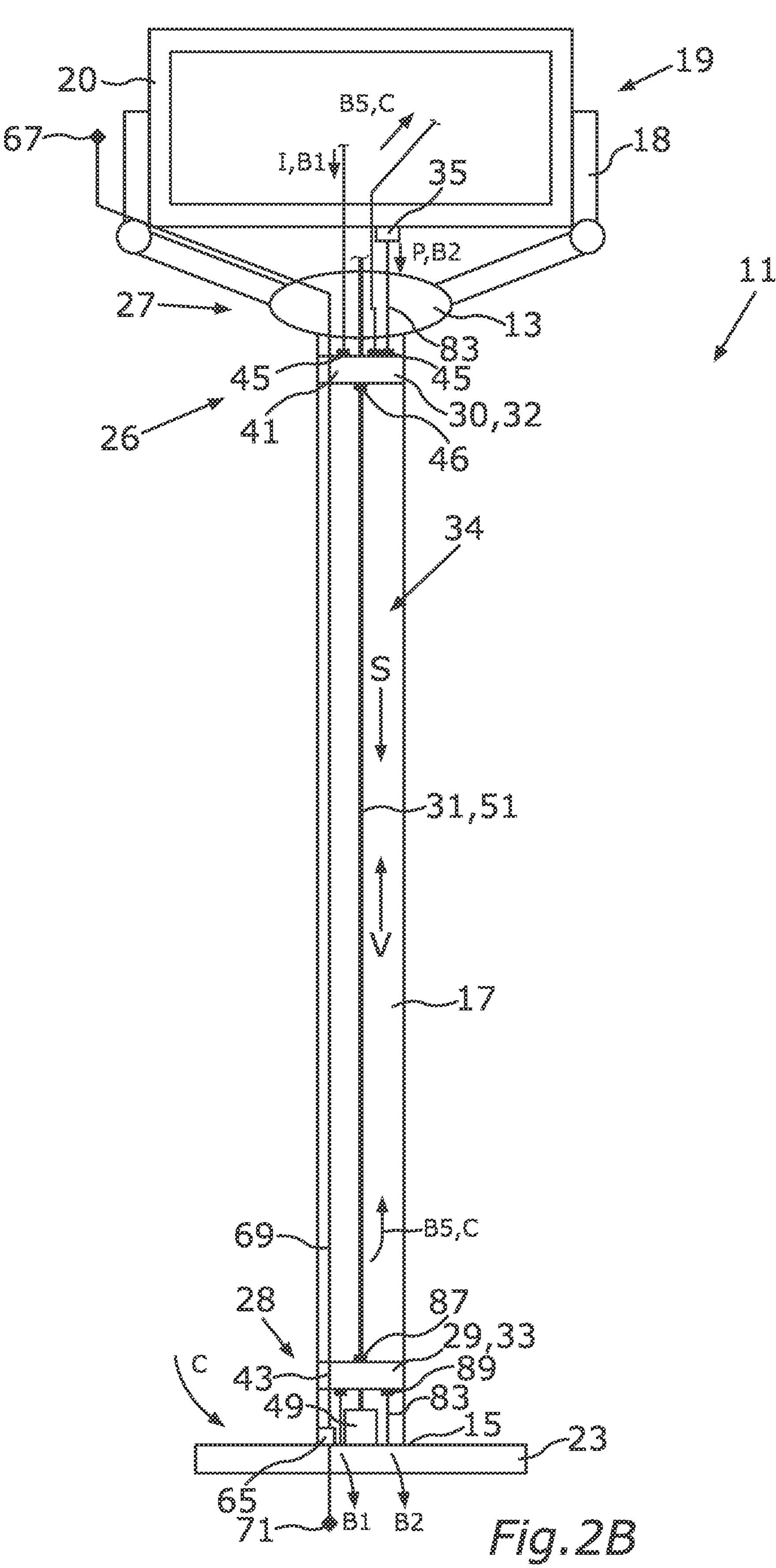

FIG. 2B schematically shows a further embodiment of the camera stabilization apparatus 11, in which an electrical power source 49 is arranged at the second end of the pendulum arm 17 for supplying electrical power to the associated camera 21 and/or the camera holding device 19. In this respect, the electrical power source 49 may also represent a functional element 25 which may be held by the functional element holding device 23. In particular, the arrangement of the electrical power source 49 at the second end 15 of the pendulum arm 17 enables the electrical power source 49 to be used as a counterweight to the camera 21 and thereby balance the camera stabilization apparatus 11. In particular, the electrical power source 49 may be provided to supply electrical power to the associated camera 21 connected to the camera holding device 19, for which purpose the electrical power source 49 may transmit a power supply signal V to the first end 13 of the pendulum arm 17 by means of a power supply cable 51. The power supply signal V forms an operating signal within the meaning of the present disclosure. The electrical power source 49 may alternatively or additionally be provided to supply electrical power to the camera holding device 19 itself (for example, a drive motor of the camera holding device 19). Since the frame 20 of the camera holding device 19 is rotatable relative to the mount 18 and the mount 18 is rotatable relative to the pendulum arm, the orientation and/or tilting of the camera 21 can also be changed by appropriately controlling the camera holding device 19, which may be done in particular by electrically controlling the camera holding device 19. The electrical power source 49 may in particular be a battery or an accumulator.

In order to again achieve a weight reduction of the camera stabilization apparatus 11, but nevertheless be able to transmit different types of operating signals B1 and/or B2 from the first end 13 of the pendulum arm 17 to the second end 15, in this embodiment the first part 27 of the signal concentration device 26 is configured to transmit the operating signals B1 and/or B2 to the second part 28 of the signal concentration device 26 via the power supply cable 51. The different types of operating signals B1 and/or B2 may include, for example, an image signal I and a position sensor signal P. In particular, the first part 27 of the signal concentration device 26 may be configured to modulate the operating signals B1 and B2 onto the power supply signal V, whereby by this transmission of the operating signals B1 and/or B2 via the power supply cable 51 only the power supply cable 51, which is required anyway for supplying the associated camera 21 and/or the camera holding device 19 with electrical power, has to be arranged in the interior space 34 of the pendulum arm 17, whereas additional cables for transmitting the total of three operating signals B1, B2 and V may be dispensed with.

Generally, such a supply of power by means of a power supply cable 51 extending from an electrical power source 49 arranged at the second end 15 of the pendulum arm 17 to the first end 13 of the pendulum arm 17, may also be provided in embodiments in which the first part 27 of the signal concentration device 26 is configured to transmit via a camera data cable 47 different types of operating signals B1 and B2 and/or B3 and B4, as explained with reference to FIG. 2A. Accordingly, in such embodiments, in addition to the power supply cable 51, one or more camera data cables 47 may also be arranged in the interior space 34 of the pendulum arm 17, wherein at least two different types of operating signals B1, B2, B3 and/or B4 may be transmitted via at least one of the camera data cables 47 and/or wherein at least two different types of operating signals B1, B2, B3, B4 and/or V may be transmitted via the power supply cable 51. Furthermore, in some embodiments, the explained operating status signal B5 may also be transmitted via the camera data cable 47 or the power supply cable 51.

Furthermore, in the embodiment shown in reference to FIG. 2B, a radio transmitter 65 is arranged at the second end 15 of the pendulum arm 17, which is configured to transmit operating signals B1 and B2 received at the second part 28 of the signal concentration device 26 to an external radio receiver, not shown, via a radio connection. For example, it may be provided for, to transmit the image signal I received as the first operating signal B1 to an external radio receiver so that the corresponding image data may, for example, be displayed at another location in an image recording studio and may, for example, be reviewed by a director. In addition, the radio transmitter 65 may also act as a counterweight to the camera 21.

However, in order to prevent interference of the radio signal emitted by the radio transmitter 65 in recording situations in which the second end 15 of the pendulum arm 17 is arranged near the ground, the radio transmitter 65 is connected to a camera-facing antenna 67 via an antenna cable 69 which is lead through the interior space 34 of the pendulum arm 17 to the first end 13 and the camera holding device 19, so that in such recording situations the radio connection may be established via the camera-facing antenna 67 which is not arranged near the ground. In addition, the radio transmitter 65 is also connected to a camera-facing-away antenna 71 which is arranged at the second end 15 of the pendulum arm 17, so that the radio transmitter 65 forms a diversity-/MIMO-system and, in reverse recording situations in which the camera 21 is arranged close to the ground, a stable radio connection may be established via the camera-facing-away antenna 71. Also, the additional leading of the antenna cable 69 through the interior space 34 of the pendulum arm 17 in order to be able to connect the camera-facing antenna 67 to the radio transmitter 65 is ultimately made possible by the signal concentration and the transmission of the operating signals B1 and B2 via the power supply cable 51 and/or a common camera data cable 47, in that the free space in the interior space 34 of the pendulum arm 17 which is created by dispensing with separate cables may be used for leading through the antenna cable 69.

Furthermore, in some embodiments, the antenna cable 69 (instead of the camera data cable 47) may be used as a common transmission path 31 for a plurality of different types of operating signals B1, B2, B3, B4 and/or B5.

Further, in some embodiments, the radio transmitter 65 may also be configured as a radio transmitting and receiving device, to receive the control signals C for the camera 21 and/or the camera holding device 19 via a radio connection. The control signals C received at the radio transmitting and receiving device may then be transmitted as operating signals B5 to the first part 27 of the signal concentration device 26 via the common transmission path 31, in particular the camera data cable 47 and/or the power supply cable 51. In this respect, in some embodiments, for example, a first type of operating signals B1, in particular the image signal I, may be transmittable in a first direction from the first part 27 of the signal concentration device 26 to the second part 28 of the signal concentration device 26 via the common transmission path 31, while a second type of operating signals, in particular the control signal C for the camera 21 and/or the camera holding device 19, may be transmittable in the opposite direction from the second part 28 of the signal concentration device 26 to the first part 27 of the signal concentration device 26 via the common transmission path 31.

Figure 2C:
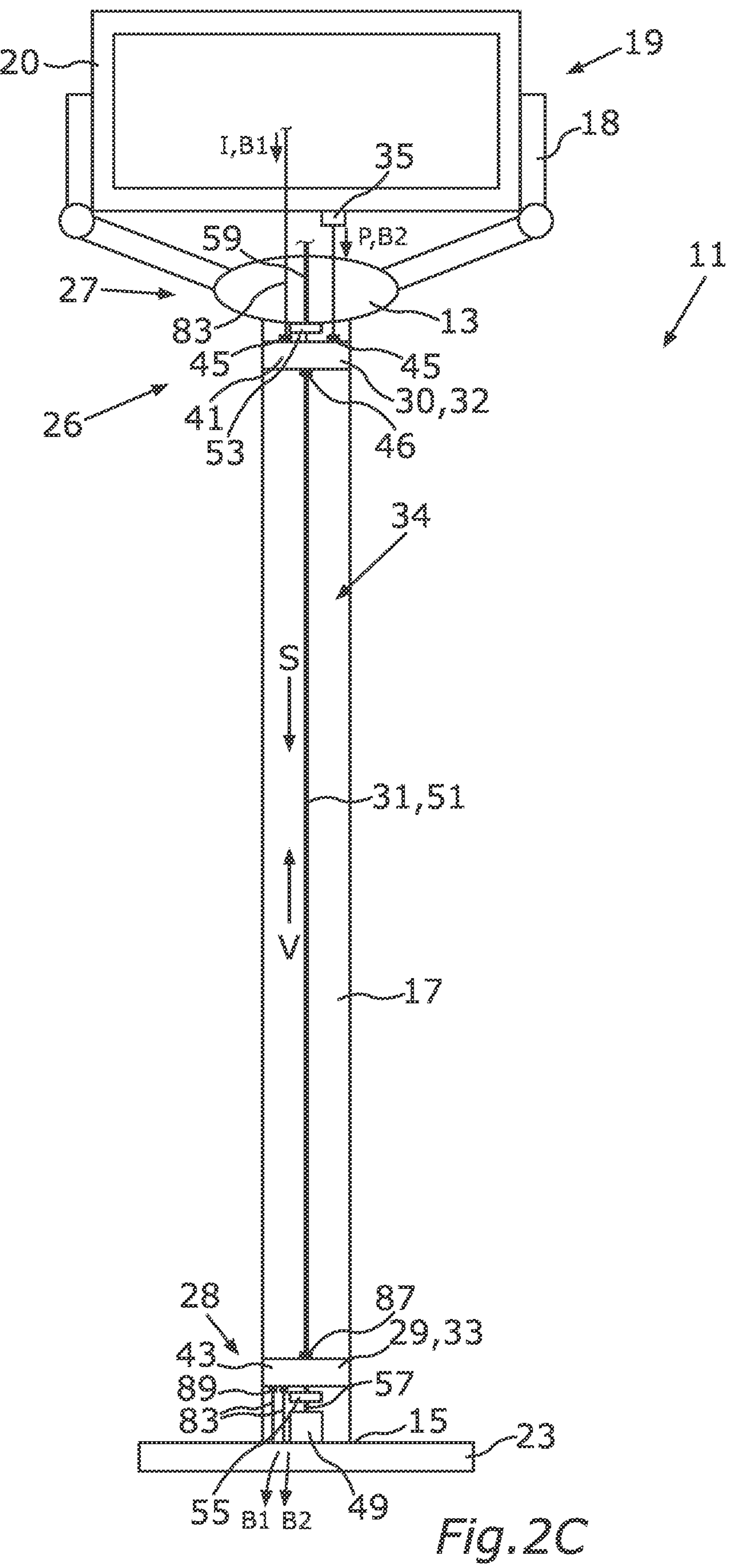

FIG. 2C shows a further embodiment in which the first part 27 of the signal concentration device 26 is configured to transmit the operating signals B1 and B2 as a common signal stream S to the second part 28 of the signal concentration device 26 via a power supply cable 51. In this embodiment, however, a first voltage transformer 53 is additionally arranged at the first end 13 of the pendulum arm 17 and a second voltage transformer 55 is arranged at the second end 15. The second voltage transformer 55 is configured to increase a supply voltage provided by the electrical power source 49 to an increased supply voltage, so that the power supply cable 51 for transmitting the power supply signal V from the second part 28 of the signal concentration device 26 to the first part 27 of the signal concentration device 26 may be configured to be thinner compared to a voltage supply power cable 57 through which the electrical power source 49 is connected to the second voltage transformer 55. The first voltage transformer 53, on the other hand, is configured to reduce the increased supply voltage to a useful voltage adapted to the associated camera 21 and/or the camera holding device 19, so that the electrical power may in turn be passed through a useful voltage supply power cable 59 which is thicker compared to the power supply cable 51. By allowing such an increase in the supply voltage at the second end 15 of the pendulum arm 17 it is possible to use a thinner power supply cable 51, and the weight of the camera stabilization apparatus 11 may in turn be reduced.

Figure 2D:
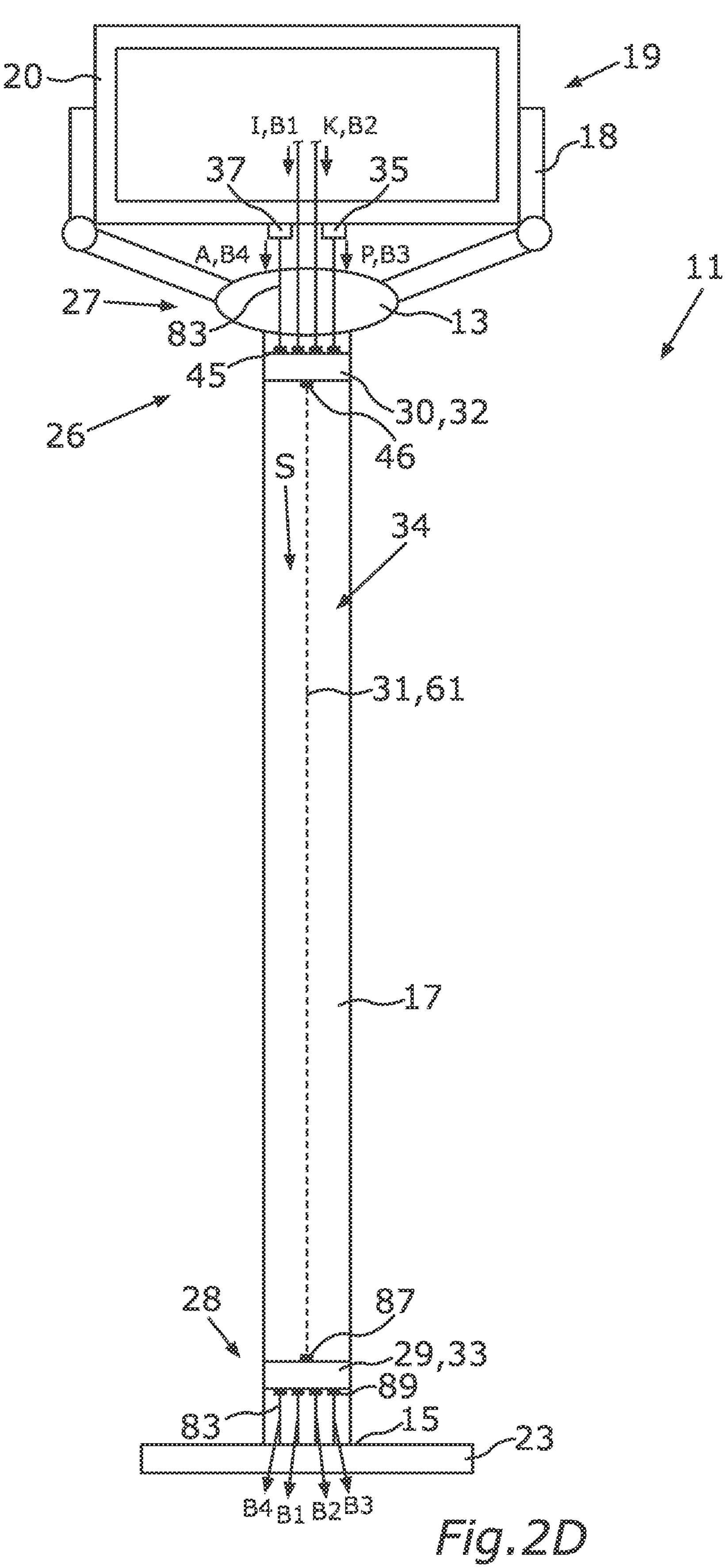

In the embodiment shown in FIG. 2D, the first part 27 of the signal concentration device 26 is configured to transmit optically the different types of operating signals B1, B2, B3 and B4 to the second part 28 of the signal concentration device 26 via a line-of-sight 61, which in this respect forms the transmission path 31. This line-of-sight 61 also exists in the interior space 34 of the pendulum arm 17, whereby for such a type of transmission, cables to be arranged in the interior space 34 for transmitting the different types of operating signals B1, B2, B3 and B4 may be completely dispensed with. In addition, it may be provided for, to transmit the operating signal B5 or several different types of operating signals in the opposite direction via the line-of-sight 61.

Figure 2E:
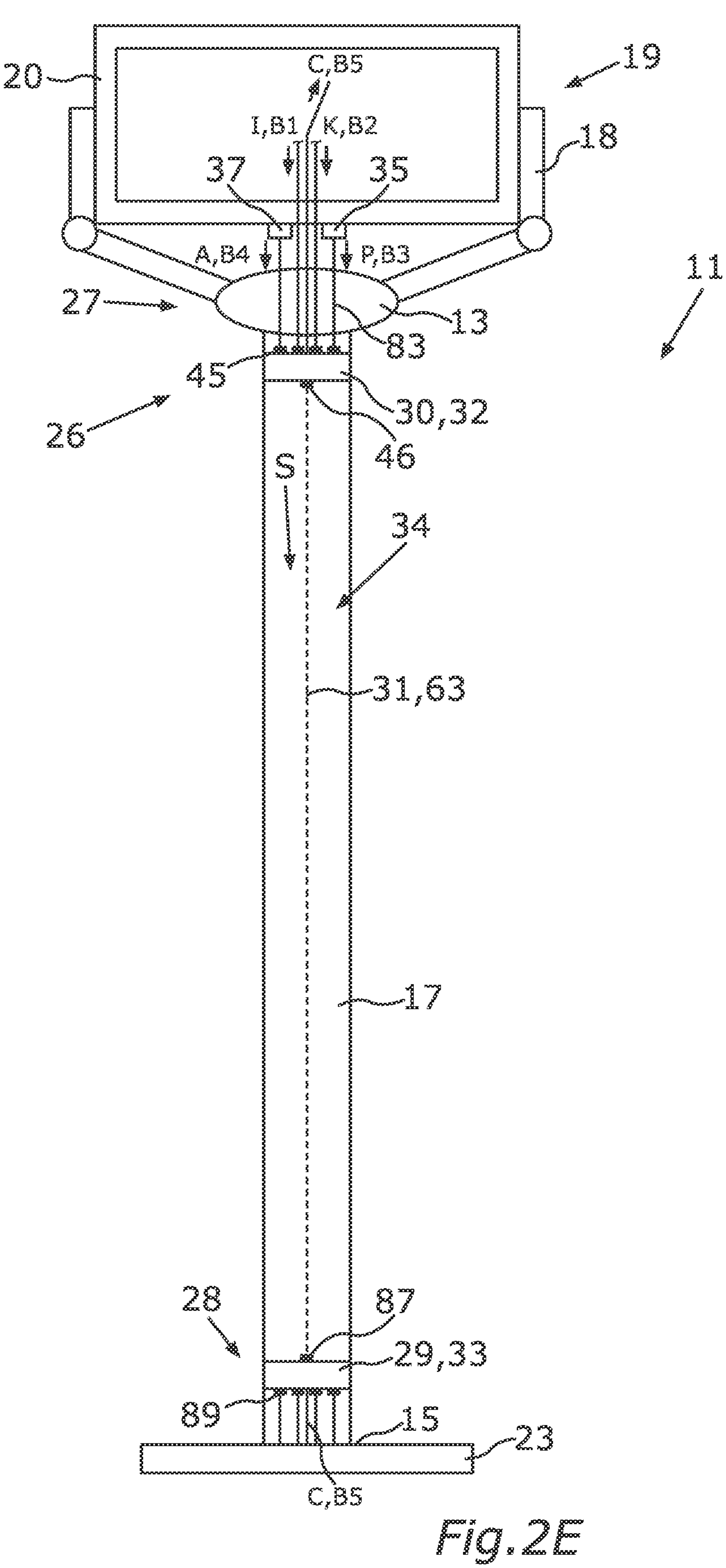

In the embodiment shown in FIG. 2E, likewise a wireless transmission of the different types of operating signals B1, B2, B3, B4 and/or B5 is also provided, wherein the common transmission path 31 is realized by a radio connection 63 between the first part 27 of the signal concentration device 26 at the first end 13 of the pendulum arm 17 and the second part 27 of the signal concentration device 26 at the second end 15 of the pendulum arm 17. In particular, this radio connection 63 may be a Bluetooth connection, an NFC (near field communication) connection, a mobile-radio connection and/or a WLAN/WiFi connection.

LIST OF REFERENCE NUMERALS

11 camera stabilization apparatus
13 first end
15 second end
17 pendulum arm
18 mount
19 camera holding device
20 frame
21 camera
23 functional element holding device
25 functional element
26 signal concentration device
27 first part of the signal concentration device
28 second part of the signal concentration device
29 signal receiver
30 signal receiver
31 transmission path
32 signal transmitter
33 signal transmitter
34 interior space
35 position sensor
37 inertial sensor
39 red light/tally
41 multiplexer
43 demultiplexer
45 signal input
46 signal output
47 camera data cable
49 electrical power source
51 power supply cable
53 first voltage transformer
55 second voltage transformer
57 voltage supply power cable
59 useful voltage supply power cable
61 line-of-sight connection
63 radio connection
65 radio emitter
67 camera-facing antenna
69 antenna cable
71 camera-facing-away antenna
73 screen
75 gimbal connection
77 support arm
79 strap
81 cameraman
83 signal cable
85 objective
87 signal input
89 signal output
A inertial sensor signal
C control signal
B1, B2, B3, B4, B5 operating signal
I image signal
K camera status signal
P position sensor signal
S signal stream
V power supply signal

The invention claimed is:

1. A camera stabilization apparatus, comprising:
a pendulum arm extending from a first end to a second end, the pendulum arm comprising at the first end a camera holding device for holding an associated camera and at the second end a functional element holding device for holding an associated functional element,
wherein a radio transmitter is arranged at the second end of the pendulum arm, which radio transmitter is configured to transmit at least one operating signal to an external radio receiver via a radio connection,
wherein the radio transmitter is associated with a camera-facing antenna for establishing the radio connection with the external radio receiver,
wherein the camera-facing antenna is arranged at the first end of the pendulum arm, and
wherein the camera-facing antenna is connected to the radio transmitter via an antenna cable extending within the pendulum arm.

2. A camera stabilization apparatus according to claim 1, further comprising a signal concentration device configured to transmit, via a common transmission path, a plurality of operating signals between the first end of the pendulum arm and the second end of the pendulum arm.

3. A camera stabilization apparatus according to claim 2, wherein the plurality of operating signals comprise at least two of the following operating signals:

a power supply signal for supplying at least one of the associated camera, the camera holding device or the associated functional element with electrical power;

an image signal of the associated camera in a format for representation on a screen;

an image signal of the associated camera in a format for onward transmission to an external radio receiver;

an image signal in a format for transmission to the associated camera;

an objective setting signal representing a setting value of a parameter of an objective of the associated camera;

a control signal for controlling the associated camera including an objective of the associated camera;

a control signal for controlling the camera holding device;

an audio signal of an associated microphone;

a position sensor signal of a position sensor;

a camera status signal representing a recording state, an inactive state, or an off state of the associated camera; or an inertial sensor signal of an inertial sensor.

4. A camera stabilization apparatus according to claim 2, wherein the common transmission path runs through an interior space of the pendulum arm.

5. A camera stabilization apparatus according to claim 2, wherein the signal concentration device is configured to transmit the plurality of operating signals optically, electrically or electromagnetically.

6. A camera stabilization apparatus according to claim 2, wherein the signal concentration device is configured to transmit the plurality of operating signals wirelessly or wired.

7. A camera stabilization apparatus according to claim 2, wherein the signal concentration device is configured to transmit, via the common transmission path, one of the plurality of operating signals from the first end to the second end of the pendulum arm and another one of the plurality of operating signals from the second end to the first end of the pendulum arm.

8. A camera stabilization apparatus according to claim 7, wherein the signal concentration device comprises—at the first end of the pendulum arm—a first signal transmitter and a first signal receiver, and—at the second end of the pendulum arm—a second signal transmitter associated with the first signal receiver and a second signal receiver associated with the first signal transmitter.

9. A camera stabilization apparatus according to claim 2, wherein the signal concentration device is configured to transmit, via the common transmission path, the plurality of operating signals from one end of the two ends of the pendulum arm to the other end of the two ends of the pendulum arm.

10. A camera stabilization apparatus according to claim 9, wherein the signal concentration device comprises a signal concentrator at one of the two ends of the pendulum arm and a signal extractor at the other of the two ends of the pendulum arm.

11. A camera stabilization apparatus according to claim 10, wherein the signal concentrator is configured to receive the plurality of operating signals at respective signal inputs and to combine them into a common signal stream, wherein the signal extractor is configured to extract the plurality of operating signals from the common signal stream.

12. A camera stabilization apparatus according to claim 11, wherein the common transmission path comprises a camera data cable, wherein the signal concentrator is configured to transmit the common signal stream to the signal extractor via the common camera data cable.

13. A camera stabilization apparatus according to claim 2, wherein an electrical power source is arranged at the second end of the pendulum arm, which electrical power source is configured to supply at least one of the associated camera or the camera holding device with electrical power in the form of a power supply signal, wherein the transmission path includes a power supply cable, wherein the power supply signal forms one of the plurality of operating signals, and wherein the signal concentration device is configured to transmit a further one of the plurality of operating signals via the power supply cable.

14. A camera stabilization apparatus according to claim 13, wherein a first voltage transformer is arranged at the first end of the pendulum arm and a second voltage transformer is arranged at the second end of the pendulum arm, wherein the second voltage transformer is configured to increase an electrical voltage value of the power supply signal to an increased supply voltage, and wherein the first voltage transformer is configured to reduce the increased supply voltage to a value of an electrical useful voltage adapted for at least one of the associated camera or the camera holding device.

15. A camera stabilization apparatus according to claim 2, wherein a line-of-sight exists along the transmission path, wherein the signal concentration device is configured to optically transmit the plurality of operating signals via the line-of-sight.

16. A camera stabilization apparatus according to claim 2, wherein the signal concentration device is configured to transmit the plurality of operating signals along the transmission path via a radio connection.

17. A camera stabilization apparatus according to claim 2, wherein a radio transmitter is arranged at the second end of the pendulum arm, which radio transmitter is configured to transmit at least one of the operating signals transmitted via the transmission path to the second end of the pendulum arm to an external radio receiver via a radio connection.

18. A camera stabilization apparatus according to claim 17, wherein the radio transmitter is associated with a camera-facing antenna for establishing the radio connection with the external radio receiver, wherein the camera-facing antenna is arranged at the first end of the pendulum arm, and wherein the camera-facing antenna is connected to the radio transmitter via an antenna cable extending within the pendulum arm.

19. A camera stabilization apparatus according to claim 2, wherein the signal concentration device comprises a plurality of modules which are configured to at least one of transmit or receive the plurality of operating signals via different interface configurations.

20. A camera stabilization apparatus according to claim 2, wherein the signal concentration device comprises an image data compressor which is configured to compress image data received from the associated camera and to transmit the compressed image data via the common transmission path.

21. A camera stabilization apparatus according to claim 1, wherein the pendulum arm is gimbaled to a support arm for supporting the camera stabilization apparatus.

22. A camera stabilization apparatus, comprising a pendulum arm extending from a first end to a second end, the pendulum arm comprising at the first end a camera holding device for holding an associated camera and at the second end a functional element holding device for holding an associated functional element, further comprising a signal concentration device configured to transmit, via a common transmission path, at least two different types of operating signals between the first end of the pendulum arm and the second end of the pendulum arm, wherein the at least two different types of operating signals comprise at least the following operating signals:

an audio signal of an associated microphone;

a position sensor signal of a position sensor;

a camera status signal representing a recording state, an inactive state, or an off state of the associated camera; and an inertial sensor signal of an inertial sensor, wherein a radio transmitter is arranged at the second end of the pendulum arm, which radio transmitter is configured to transmit at least one of the operating signals transmitted via the transmission path to the second end of the pendulum arm to an external radio receiver via a radio connection, and wherein the radio transmitter is associated with a camera-facing antenna for establishing the radio connection with the external radio receiver, wherein the camera-facing antenna is arranged at the first end of the pendulum arm, and wherein the camera-facing antenna is connected to the radio transmitter via an antenna cable extending within the pendulum arm.

* * * * *